US011898464B2

(12) United States Patent
Kray et al.

(10) Patent No.: US 11,898,464 B2
(45) Date of Patent: Feb. 13, 2024

(54) AIRFOIL FOR A GAS TURBINE ENGINE

(71) Applicant: General Electric Company, Schenectady, NY (US)

(72) Inventors: Nicholas Joseph Kray, Mason, OH (US); Nitesh Jain, Bangalore (IN)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 17/232,822

(22) Filed: Apr. 16, 2021

(65) Prior Publication Data

US 2022/0333492 A1 Oct. 20, 2022

(51) Int. Cl.
*F01D 5/28* (2006.01)
*F01D 5/14* (2006.01)

(52) U.S. Cl.
CPC ............. *F01D 5/282* (2013.01); *F01D 5/147* (2013.01); *F05D 2220/36* (2013.01); *F05D 2300/603* (2013.01)

(58) Field of Classification Search
CPC . F01D 5/147; F01D 5/28; F01D 5/282; F04D 29/324; F04D 29/288; B64C 11/20; B64C 11/24; B64C 11/26
See application file for complete search history.

(56) References Cited

U.S. PATENT DOCUMENTS 4,022,540 A 5/1977 Young
5,127,802 A * 7/1992 Carlson .................. B29C 44/18 29/889.71
5,129,787 A * 7/1992 Violette ............. B29D 99/0028 416/241 A
5,634,771 A 6/1997 Howard et al.
5,836,744 A 11/1998 Zipps et al.
6,398,501 B1 6/2002 Darkins, Jr. et al.
8,262,362 B2 9/2012 Yarbrough
9,017,510 B2 4/2015 Hansen
9,416,668 B2 * 8/2016 Muron .................. F03D 1/0675 264/261
9,617,973 B2 * 4/2017 Stege ..................... F03D 1/0675
10,612,560 B2 4/2020 Kray et al.
10,677,222 B2 6/2020 Warchol
2010/0132884 A1 * 6/2010 Bachmann .......... B29C 66/1142 156/423
2011/0223032 A1 * 9/2011 Tobin ................. B29D 99/0025 416/229 R (Continued)

FOREIGN PATENT DOCUMENTS

CA 1085739 A 9/1980
EP 3216693 A1 9/2017

(Continued)

*Primary Examiner* — Woody A Lee, Jr.
*Assistant Examiner* — Cameron A Corday
(74) *Attorney, Agent, or Firm* — Dority & Manning, P.A.

(57) ABSTRACT

In one exemplary embodiment of the present disclosure an airfoil is provided. The airfoil defines a spanwise direction, a root end, and a tip end. The airfoil includes: a body defining a pressure side and a suction side and extending along the spanwise direction between the root end and the tip end, the body formed of a composite material; and a spar enclosed in the body of the airfoil extending along the spanwise direction, the spar comprising a plurality of spar segments arranged in an overlapping configuration along the spanwise direction.

5 Claims, 5 Drawing Sheets

(56) References Cited

U.S. PATENT DOCUMENTS

| | | | |
|---|---|---|---|
| 2014/0112796 A1 | 4/2014 | Kray et al. | |
| 2014/0186189 A1* | 7/2014 | Stege | F03D 1/0675 264/261 |
| 2017/0259902 A1 | 9/2017 | Cebolla Garrofe et al. | |

FOREIGN PATENT DOCUMENTS

| | | |
|---|---|---|
| EP | 3248864 A1 | 11/2017 |
| EP | 3425195 A1 * | 1/2019 |

* cited by examiner

AIRFOIL FOR A GAS TURBINE ENGINE

FIELD

The present disclosure relates to an airfoil for a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. The turbomachine may include a spool arrangement. For example, the spool arrangement may include a high pressure, high speed spool and a low pressure, low speed spool. A combustion section of the turbomachine receives pressurized air, which is mixed with fuel and combusted within a combustion chamber to generate combustion gases. The combustion gases are provided to the spool arrangement. For example, the combustion gases may be provided first to a high pressure turbine of the high pressure spool, driving the high pressure spool, and subsequently to a low speed turbine of the low speed spool, driving the low speed spool.

In a turbofan engine, the fan assembly generally includes a fan having a plurality of airfoils or fan blades extending radially outwardly from a central hub and/or a disk. During certain operations, the fan blades provide an airflow into the turbomachine and over the turbomachine to generate thrust.

At least certain modern fan blades are formed of composite material(s) to reduce a weight of the fan blades. Fan blades of composite material(s) may be subjected to a foreign object ingestion event, such as an ice ingestion or bird strike. Improvements to airfoil design directed to accommodating these events would be welcomed in the art.

BRIEF DESCRIPTION

Aspects and advantages of the invention will be set forth in part in the following description, or may be obvious from the description, or may be learned through practice of the invention.

In one exemplary embodiment of the present disclosure an airfoil is provided. The airfoil defines a spanwise direction, a root end, and a tip end. The airfoil includes: a body defining a pressure side and a suction side and extending along the spanwise direction between the root end and the tip end, the body formed of a composite material; and a spar enclosed in the body of the airfoil extending along the spanwise direction, the spar comprising a plurality of spar segments arranged in an overlapping configuration along the spanwise direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
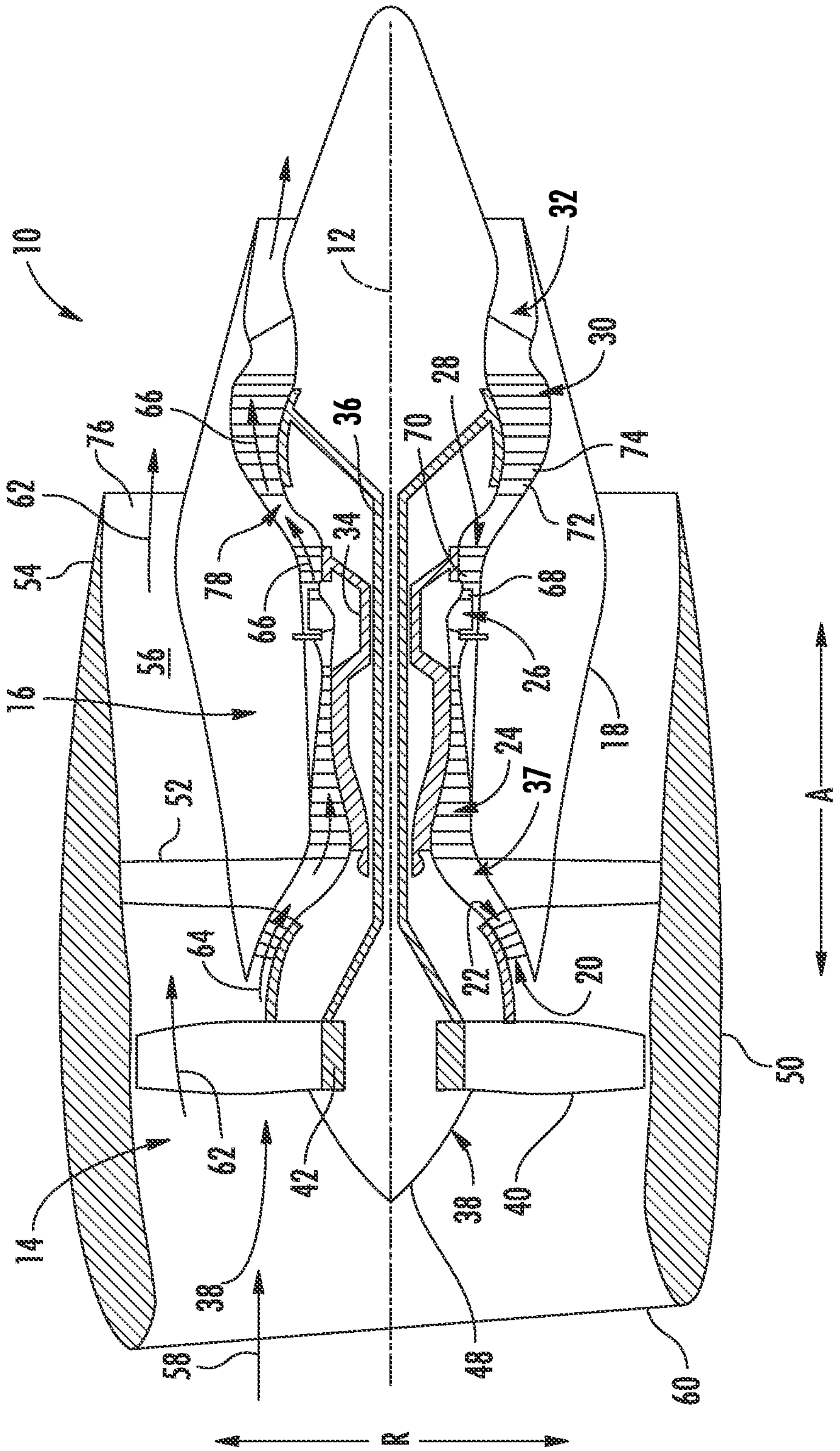
FIG. 1 is a cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to an airfoil for a gas turbine engine, such as a fan blade for a fan assembly of a turbofan engine or turboprop engine. The airfoil may generally be formed of a composite material and may include one or more strengthening members. The strengthening members are coupled in a way to define failure points for the airfoil such that in the event the airfoil encounters a foreign object ingestion, it will fail at one of the failure points so as to break off only a portion of the airfoil rather than the whole airfoil.

In particular, the airfoil of the present disclosure generally includes a composite body portion and a spar enclosed within the composite body portion. The spar is a segmented spar, having a plurality of spar segments bonded together at joints. The spar may be weaker at the joints, such that the spar allows the airfoil to fail at these joints.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as “turbofan engine 10.” As shown in FIG. 1, the turbofan engine 10 defines an axial direction A (extending parallel to a longitudinal centerline 12 provided for reference), a radial direction R, and a circumferential direction C (see FIG. 2). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be supported relative to the core 16 by a plurality of circumferentially-spaced outlet guide vanes 52. Moreover, a downstream section 54 of the nacelle 50 may extend over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft 36 and fan section 14, etc. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
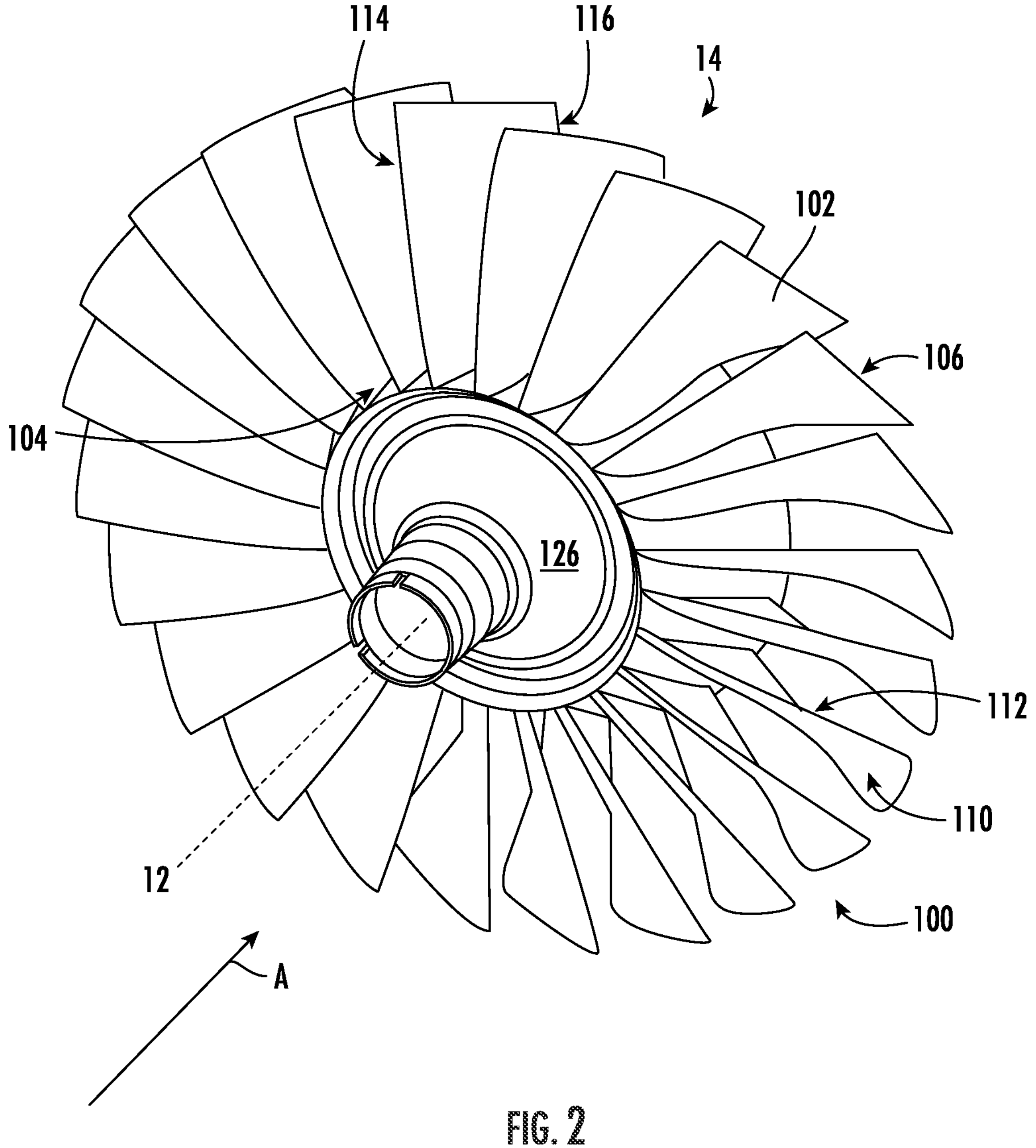
FIG. 2 is a perspective view of a fan assembly for a gas turbine engine in accordance with an exemplary aspect of the present disclosure.
Figure 3:
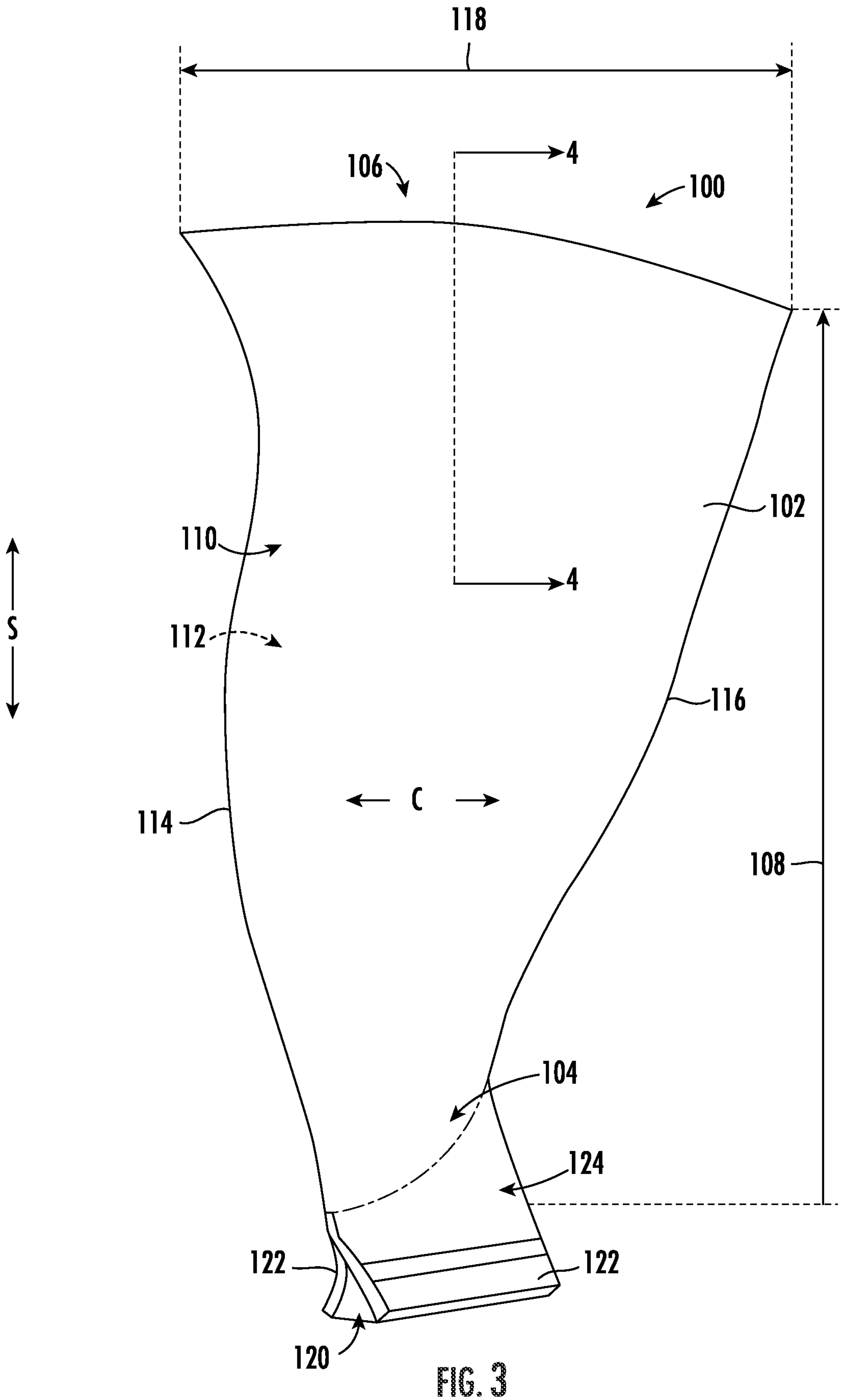
FIG. 3 is a perspective view of a fan blade for a gas turbine engine in accordance with an exemplary aspect of the present disclosure.

Reference will now be made to FIGS. 2 and 3. FIG. 2 provides a perspective view of the fan assembly 14 of FIG. 1 and FIG. 3 provides a side view of a fan blade 100 of the fan assembly 14 of FIG. 2. Although the illustrated airfoils are shown as fan blades 100, it should be understood that the following discussion may be equally applied to another airfoil embodiment, e.g., an outlet guide vane, a stator vane or rotor blade of a compressor 22, 24 and/or turbine 28, 32 (see FIG. 1).

As shown, each fan blade 100 extends outwardly along a local spanwise direction S (see FIG. 3). Further, each fan blade 100 includes a body 102 extending from a root end 104 to a tip end 106 along the spanwise direction S. The spanwise direction S may generally be aligned with a radial direction R of an engine incorporating the fan assembly 14. Each fan blade 100 may further define a span 108 along the spanwise direction S. The span 108 is defined by a distance in the spanwise direction S along a span centerline of the fan blade 100 from the root end 104 to the tip end 106. The body 102 of each of the fan blades 100 further defines a pressure side 110, a suction side 112, a leading edge 114, and a trailing edge 116. The pressure side 110 and the suction side 112 of the body 102 of the fan blade 100 extend from the leading edge 114 to the trailing edge 116 of the fan blade 100 and between the root end 104 and tip end 106 along the spanwise direction S.

Further, it should be recognized that the body 102 of the fan blade 100 may define a chordwise direction C along a chord 118 at each point along the span 108 and extending between the leading edge 114 and the trailing edge 116. The chord 118 is generally a distance from the leading edge 114 to the trailing edge 116, and the chordwise direction C is generally a direction at a given spanwise location between the leading edge 114 and the trailing edge 116. Further, the chord 118 may vary along the span 108 of the fan blade 100. For instance, in the depicted embodiment, the chord 118 increases along the span 108 toward the tip end 106. Though, in other embodiments, the chord 118 may be approximately constant throughout the span 108 or may decrease from the root end 104 to the tip end 106.

For the embodiment shown, each fan blade 100 further includes an axial dovetail 120 formed initially with the body 102 of the fan blade 100. The axial dovetail 120 includes a pair of opposed pressure faces 122 leading to a transition section 124. When mounted within the fan assembly 14, as illustrated in FIG. 2, the dovetail 120 is disposed in a dovetail slot of a fan rotor disk 126, thereby attaching the fan blades 100 within the fan assembly 14.

The body 102 of the fan blade 100 of FIG. 3 may have a hollow configuration. In another example, the fan blade 100 may include one or more cavities for purposes such as cooling. Alternatively, the body 102 of the fan blade 100 may be of solid construction.

In an embodiment, the body 102 of the fan blade 100 may include at least one composite ply. More specifically, in at least certain exemplary embodiments, the body 102 of the airfoil may be formed substantially of composite materials, such as substantially completely of composite materials.

The term "composite material" as used herein may be defined as a material containing a reinforcement such as fibers or particles supported in a binder or matrix material. Composite materials include metallic and non-metallic composites. One useful embodiment for composite airfoils is made of a unidirectional tape material and an epoxy resin matrix. The composite airfoils disclosed herein may include composite materials of the non-metallic type made of a material containing a fiber such as a carbonaceous, silica, metal, metal oxide, or ceramic fiber embedded in a resin material such as Epoxy, PMR15, BMI, PEED, etc. A more particular material includes fibers unidirectionally aligned into a tape that is impregnated with a resin, formed into a part shape, and cured via an autoclaving process or press molding to form a light-weight, stiff, relatively homogeneous article having laminates within. However, any suitable composite material and/or formation process may be used.

Additionally, or alternatively, although not depicted, the fan blade 100 may be formed of any other suitable material, and may include, e.g., one or more reinforcing portions added to, e.g., the leading edge 114, the trailing edge 116, or both, such as one or more of a metal reinforcing material, a shape memory alloy material, etc.

Figure 4:
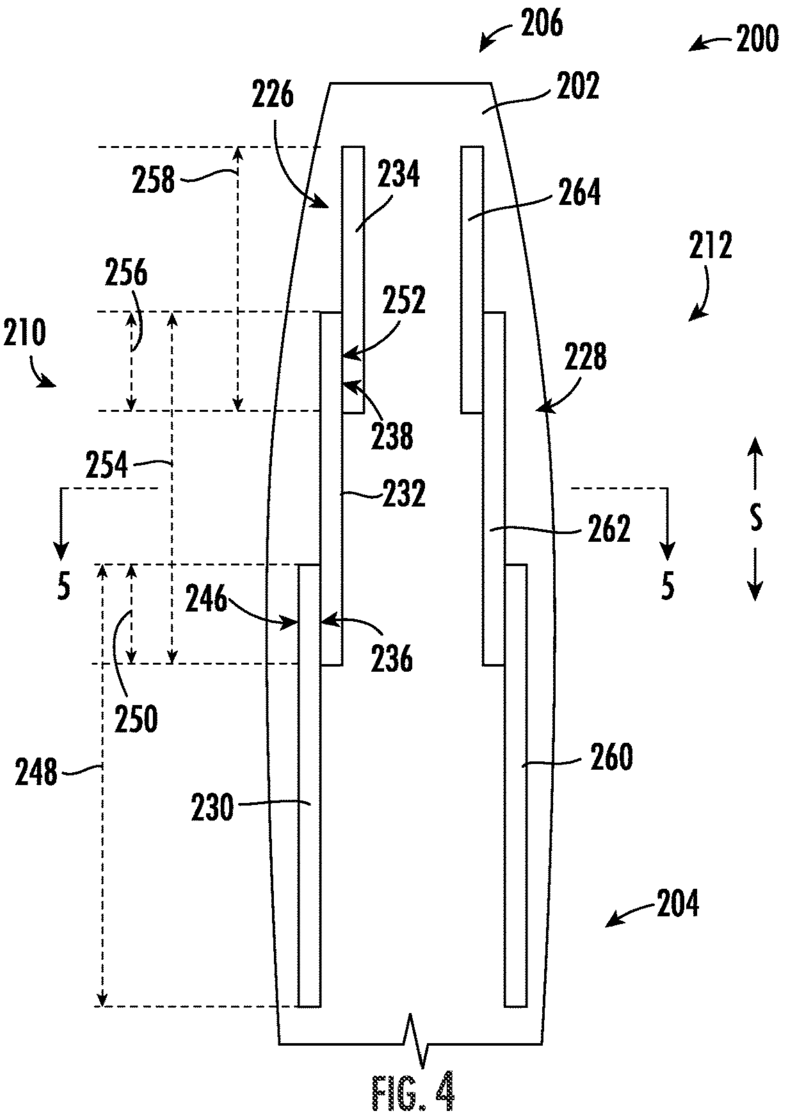
FIG. 4 is a cross-sectional view of an airfoil for a gas turbine engine in accordance with an exemplary aspect of the present disclosure.

More specifically, referring now to FIG. 4, a cross-sectional view of an airfoil 200 in accordance with an exemplary embodiment of the present disclosure is provided. In certain exemplary aspects, the airfoil 200 of FIG. 4 may be configured in a similar manner as the fan blade 100 of FIG. 3, and the view in FIG. 4 may be a cross-sectional view along Line 4-4 in FIG. 3.

In such a manner, it will be appreciated that the airfoil 200 defines a spanwise direction S, a root end 204, and a tip end 206, and further that the airfoil 200 includes a body 202 defining a pressure side 210 and a suction side 212 and extending along the spanwise direction S between the root end 204 and the tip end 206. The body 202 may be formed of a composite material.

As will be appreciated from the cross-sectional view of FIG. 4, the airfoil 200 may additionally include one or more components or features for adding strength to the airfoil 200. More specifically, for the embodiment shown the airfoil 200 further includes a spar enclosed within the body 202 of the airfoil 200 extending along the spanwise direction S. The spar includes a plurality of spar segments arranged in an overlapping configuration along the spanwise direction S.

Figure 5:
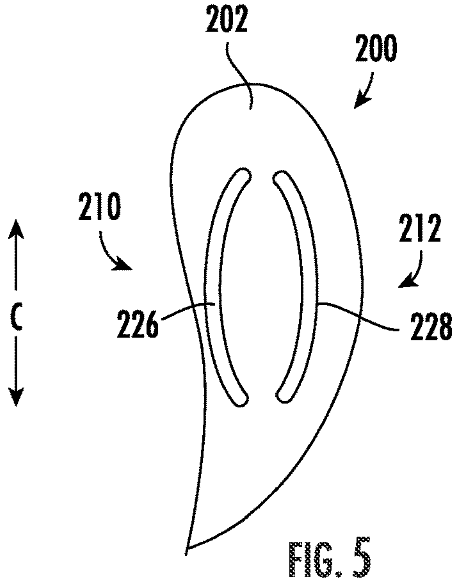
FIG. 5 is a cross-sectional view of a spar of the exemplary airfoil of FIG. 4 in accordance with an exemplary aspect of the present disclosure.

More specifically, for the exemplary embodiment depicted, the spar is a first spar 226 and the airfoil 200 further includes a second spar 228. For the embodiment shown, the first spar 226 is a pressure side spar and the second spar 228 is a suction side spar. Referring briefly also to FIG. 5, providing a cross-sectional view of the airfoil 200 along Line 5-5 and FIG. 4, it will be appreciated that the first spar 226 and the second spar 228 extend generally in the chordwise direction C of the airfoil 200. For the embodiment shown, the first spar 226 and the second spar 228 each extends at least about 50% of a chord of the airfoil 200 in the chordwise direction C. However, in other embodiments, the first spar 226, the second spar 228, or both may extend less than 50% of the chord of the airfoil 200 in the chordwise direction C.

Referring again to FIG. 4, and more specifically to the first spar 226 of FIG. 4, it will be appreciated that the first spar 226 includes a plurality of spar segments that overlap one another and are bonded together at respective lap joints. The term "lap joint" refers generally to any joint whereby the two components are coupled together using an adhesive between two adjacent surfaces.

It will be appreciated, however, that in other exemplary aspects, the plurality of spar segments may be attached using other suitable joints, such as joints formed from complementary geometries, joints utilizing mechanical fasteners, etc.

More specifically, for the embodiment shown, the first spar 226 includes a first spar segment 230, a second spar segment 232, and a third spar segment 234. The first spar segment 230 overlaps with the second spar segment 232 and is bonded to the second spar segment 232 at a first lap joint 236, and similarly, the second spar segment 232 overlaps with the third spar segment 234 and is bonded to the third spar segment 234 at a second lap joint 238.

It will be appreciated that although for the embodiment shown, the first spar segment 230 includes three spar segments, in other exemplary embodiments, the first spar 226 may include any other suitable number of spar segments. For example, in certain exemplary embodiments, the first spar 226 may include two spar segments, at least four spar segments, such as at least five spar segments, such as at least six spar segments, such as up to 30 spar segments, such as up to 25 spar segments, such as up to 20 spar segments, such as up to 15 spar segments, such as up to 10 spar segments.

Figure 6:
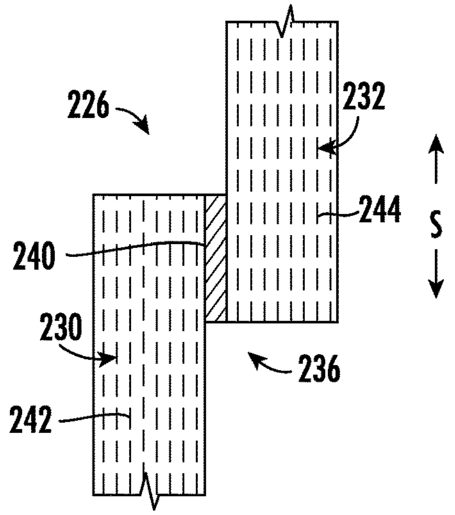
FIG. 6 is a close-up, cross-sectional view of a spar of the exemplary airfoil of FIG. 4 in accordance with an exemplary aspect of the present disclosure.

More specifically, referring particularly to FIG. 6, providing a close-up view of the first lap joint 236, it will be appreciated that the first spar segment 230 is bonded to the second spar segment 232 using an adhesive 240. For the embodiment shown, the adhesive 240 is a single layer of adhesive 240, however in other embodiments, the plurality of spar segments may be bonded to one another using any suitable number of adhesives, types of adhesives, etc.

As will also be appreciated from the close-up view of FIG. 6, the plurality of spar segments of the first spar 226 are formed of a composite material. More specifically, the plurality of spar segments are separately formed of a composite material and subsequently bonded together using the adhesive 240. For example, as will be appreciated from FIG. 6, the first spar segment 230 includes a plurality of fibers 242 and the second spar segment 232 similarly includes a plurality of fibers 244. The fibers 242 of the first spar segment 230 do not overlap and/or intermingle with the fibers 244 of the second spar segment 232.

In such a manner, it will be appreciated that in the event of an external stress or force being applied to the airfoil 200, the airfoil 200 may be designed to fail at a joint between adjacent spar segments of a particular spar. In such a manner, an airfoil 200 in accordance with the present disclosure may be configured as a frangible airfoil having preset failure points at the joints between adjacent spar segments of a particular spar.

It will further be appreciated that aspects of the spar(s) included in the airfoil 200 may be designed to dictate how much stress is required to break off a particular point of the airfoil 200, and further, aspects of the spar(s) may be designed to dictate where the airfoil 200 is configured to break first.

For example, referring now back to FIG. 4, it will be appreciated that the first spar segment 230 overlaps with the second spar segment 232 at a first overlap section 246 of the first spar segment 230. The first spar segment 230 defines a first overall length 248 along a lengthwise direction of the first spar segment 230, and a first overlap length 250 of the first overlap section 246 of the first spar segment 230 also along the lengthwise direction of the first spar segment 230. For the embodiment shown, the first spar segment 230 is arranged generally along the spanwise direction S. In such a manner, it will be appreciated that the first overall length 248 is defined along the spanwise direction S, and the first overlap length 250 is similarly defined along the spanwise direction S. For the embodiment shown, the first overlap length 250 is equal to 15% or less of the first overall length 248. In certain embodiments, the first overall length 248 may be equal to 12% or less of the first overall length 248, such as equal to 10% or less, such as equal to 8% or less, such as equal to 5% or less of the first overall length 248, and equal to at least about 2%, such as at least about 4%, such as at least about 6% of the first overall length 248.

Further for the embodiment shown, as noted above, the first spar 226 further includes the third spar segment 234. The second spar segment 232 overlaps with the third spar segment 234 at a second overlap section 252 of the second spar segment 232. The second spar segment 232 defines a second overall length 254 along a lengthwise direction of the second spar segment 232 and a second overlap length 256 of the second overlap section 252 along the lengthwise direction of the second spar segment 232. As with the first spar segment 230, for the embodiment shown, the second spar segment 232 is arranged generally along the spanwise direction S. In such a manner, it will be appreciated that the second overall length 254 is defined along the spanwise direction S and the second overlap length 256 is similarly defined along the spanwise direction S. For the embodiment shown, the second overlap length 256 may be equal to the first overlap length 250. In such a manner, it will be appreciated that the second overlap length 256 may be equal to 15% or less of the first overall length 248. In certain embodiments, the second overlap length 256 may be equal to 12% or less of the first overall length 248, such as equal to 10% or less, such as equal to 8% or less, such as equal to 5% or less of the first overall length 248, and equal to at least about 2%, such as at least about 4%, such as at least about 6% of the first overall length 248.

Moreover, it will be appreciated that for the embodiment shown, the spar segments of the first spar 226 may not define uniform lengths. More specifically, for the embodiment shown, the first overall length 248 of the first spar segment 230 is greater than the second overall length 254 of the second spar segment 232. For example, the second overall length 254 may be equal to less than 95% of the first overall length 248, such as less than 90% of the first overall length 248, such as less than 85% of the first overall length 248, such as less than 80% of the first overall length 248. Further, the second overall length 254 may be equal to at least about 25% of the first overall length 248, such as at least about 50% of the first overall length 248, such as equal to at least 75% of the first overall length 248.

Similarly, for the embodiment shown, the third spar segment 234 may define a third overall length 258 that is not equal to the first overall length 248 or the second overall length 254. More specifically, for the embodiment shown, the third overall length 258 of the third spar segment 234 is less than the second overall length 254 of the second spar segment 232. For example, the overall length may be equal to less than 95% of the second overall length 254, such as less than 90% of the second overall length 254, such as less than 85% of the second overall length 254, such as less than 80% of the second overall length 254. Further, the third overall length 258 may be equal to at least about 25% of the second overall length 254, such as at least about 50% of the second overall length 254, such as equal to at least 75% of the second overall length 254.

Referring still to FIG. 4, it will be appreciated that for the embodiment shown, the second spar 228 similarly includes a plurality of spar segments, and more specifically includes a first spar segment 260, a second spar segment 262, and a third spar segment 264. For the embodiment shown, the first spar 226 substantially mirrors the second spar 228. More specifically, for the embodiment shown, the first spar 226 includes the same number of spar segments as the second spar 228, with each spar segment of the first spar 226 corresponding in size and spanwise position with a spar segment of the second spar 228 (e.g., first spar segments 230, 260 having the same overall lengths and spanwise positions, second spar segments 232, 262 having the same overall lengths and spanwise positions, and third spar segments 234, 264 having the same overall lengths and spanwise positions). In such manner, it will be appreciated that the first spar 226 defines a plurality of overlap sections (sections 246, 252) and the second spar 228 similarly defines a plurality of overlap sections. For the embodiment of FIG. 4, the plurality of overlap sections (sections 246, 252) of the first spar 226 are arranged in a similar configuration as the plurality of overlap sections of the second spar 228.

It will be appreciated, that although in the embodiment depicted in FIG. 4 the lengths of the spar segments vary in the spanwise direction S, decreasing from root end 204 to tip end 206, in other exemplary embodiments, the lengths of the spar segments vary in the spanwise direction S, increasing from root end 204 to tip end 206.

It will be also appreciated that in other exemplary embodiments, an airfoil 200 having any other suitable configuration may be provided. For example, referring now to FIG. 7, a cross-sectional view airfoil 200 in accordance with another exemplary embodiment of the present disclosure is provided. The exemplary airfoil 200 of FIG. 7 may be configured in a similar manner as the exemplary airfoil 200 of FIG. 4. For example, the exemplary airfoil 200 FIG. 7 generally includes a body 202 defining a pressure side 210 and a suction side 212 and extending along a spanwise direction S between a root end 204 and a tip end 206. The body 202 of the airfoil 200 of FIG. 7 may similarly be formed of a composite material.

Figure 7:
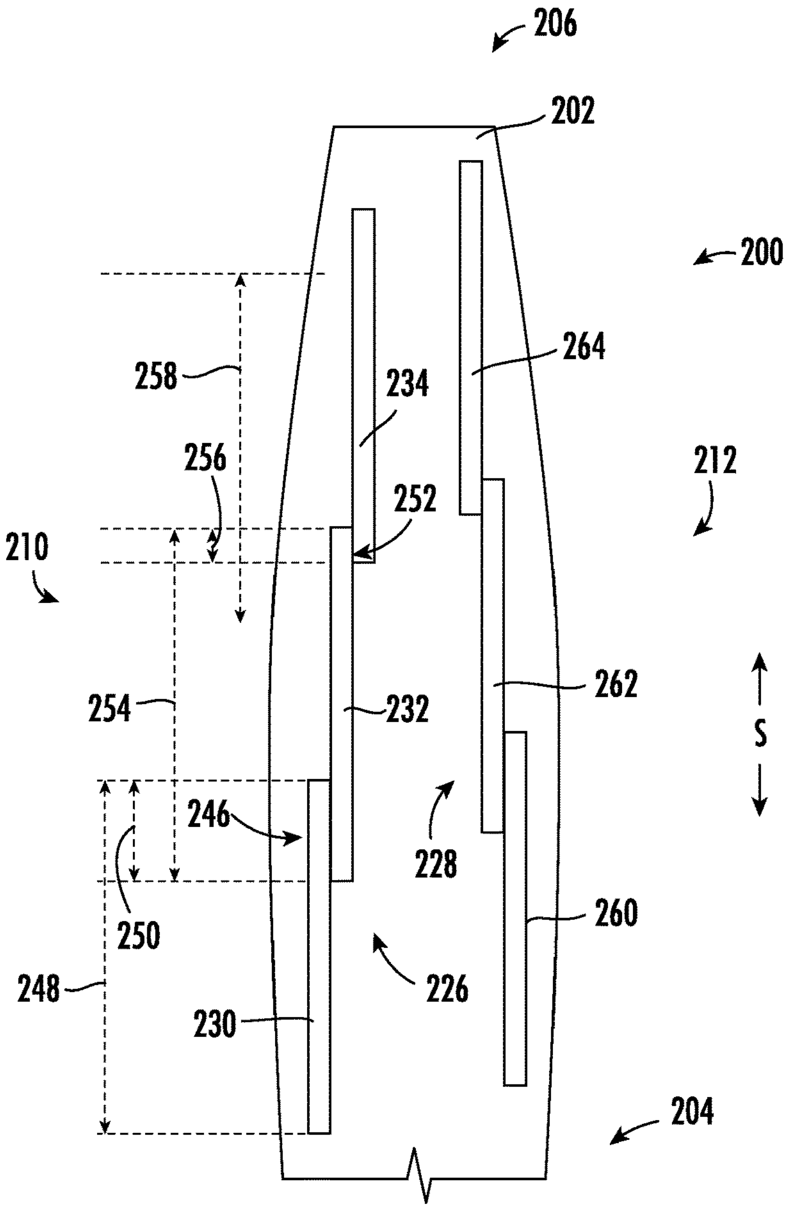
FIG. 7 is a cross-sectional view of an airfoil for a gas turbine engine in accordance with another exemplary aspect of the present disclosure.

Moreover, the exemplary airfoil 200 depicted in FIG. 7 further includes a spar enclosed within the body 202 of the airfoil 200, the spar having a plurality of spar segments arranged in an overlapping configuration. More particularly, the airfoil 200 depicted in FIG. 7 includes a first spar 226 and a second spar 228. The first spar 226 includes a first spar segment 230, a second spar segment 232, and a third spar segment 234. However, in contrast with the first spar 226 of FIG. 4, for the embodiment of FIG. 7, the first spar segment 230 defines a first overall length 248 substantially equal to a second overall length 254 of the second spar segment 232 and substantially equal to a third overall length 258 of the third spar segment 234.

In such a manner, it will be appreciated that for the embodiment of FIG. 7, at least two of the plurality of spar segments of the first spar 226 defines substantially the same overall length, or more specifically for the exemplary embodiment FIG. 7, each of the plurality of spar segments of the first spar 226 define substantially the same overall length.

Further by way of contrast, for the embodiment of FIG. 7, it will be appreciated that the first spar segment 230 defines a first overlap length 250 of a first overlap section 246 (where the first spar segment 230 overlaps with the second spar segment 232) and the second spar segment 232 defines a second overlap length 256 of a second overlap section 252 (where the second spar segment 232 overlaps with the third spar segment 234). For the embodiment shown, the first overlap length 250 is not equal to the second overlap length 256.

More specifically, for the embodiment shown, the first overlap length 250 is greater than the second overlap length 256. It will further be appreciated that for the embodiment shown, the first spar segment 230 is closer to the root end 204 of the body 202 of the airfoil 200 than the second spar segment 232, and further, the second spar segment 232 is closer to the root end 204 of the body 202 of the airfoil 200 than the third spar segment 234. As will be appreciated, the first overlap length 250 is greater than the second overlap length 256, and more specifically, the first overlap length 250 is equal to at least 110% of the second overlap length 256, such as at least 125% of the second overlap length 256, such as at least 150% of the second overlap length 256, such as at least 200% of the second overlap length 256, such as up to 5000% of the second overlap length 256.

In such a manner, it will be appreciated that the first spar 226 may define a failure point at the second overlap section 252 and a failure point at the first overlap section 246, wherein the failure point at the second overlap section 252 is designed to fail under an amount of stress less than an amount of stress configured to cause the first spar 226 to fail at the first overlap section 246. In such a manner, the airfoil 200 may be configured to fail first at an outer location along the spanwise direction S before failing at an inner location along the spanwise direction S.

It will further be appreciated that for the embodiment of FIG. 7, the second spar 228 is configured in a similar manner as the first spar 226, however for the embodiment shown, the first spar 226 does not mirror the second spar 228. For example, in the embodiment shown, it will be appreciated that the first spar 226 defines a plurality of overlap sections (overlap sections 246, 252) and the second spar 228 similarly defines a plurality of overlap sections, but the plurality of overlap sections (overlap sections 246, 252) of the first spar 226 are arranged in a unique configuration relative to the plurality of overlap sections of the second spar 228. More specifically, for the embodiment shown, the plurality of overlap sections of the second spar 228 are arranged at a different spanwise location than the plurality of overlap sections of the first spar 226. However, in other exemplary embodiments, the plurality of overlap sections of the second spar 228 may instead define unique overlap lengths, may include a different number of overlap sections relative to the plurality of overlap sections of the first spar 226, etc.

Figure 8:
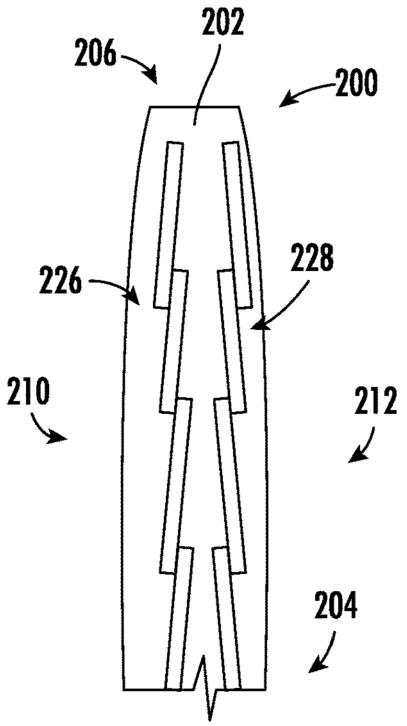
FIG. 8 is a cross-sectional view of an airfoil for a gas turbine engine in accordance with yet another exemplary aspect of the present disclosure.

Further, still, in other exemplary embodiments of the present disclosure, the first spar 226, the second spar 228, or both may have still other suitable configurations. For example, referring briefly to FIG. 8, providing a cross-sectional view of an airfoil 200 in accordance with yet another exemplary embodiment of the present disclosure, a plurality of spar segments of the first spar 226 may not be arranged precisely along a spanwise direction S of the airfoil 200, and instead may define an angle relative to the spanwise direction S of the airfoil 200. Similarly, for the embodiment of FIG. 8, the plurality of spar segments of the second spar 228 also do not extend precisely along the spanwise direction S of the airfoil 200, and instead define an angle relative to the spanwise direction S of the airfoil 200. For the embodiment shown, the plurality of spar segments of the first spar 226 taper towards the plurality of spar segments of the second spar 228 moving from a root end 204 of the body 202 of the airfoil 200 towards a tip end 206 of the body 202 of the airfoil 200, and similarly, the plurality of spar segments of the second spar 228 taper towards the plurality of spar segments of the first spar 226 moving from the root end 204 of the body 202 of the airfoil 200 towards the tip end 206 of the body 202 of the airfoil 200.

It will be appreciated that although the exemplary airfoils 200 described above with reference to FIGS. 2 through 8 are generally described as having two spars (the first spar 226 and the second spar 228), in other exemplary aspects of the present disclosure, the airfoils 200 may only include a single spar positioned, e.g., along a centerline of the airfoil 200. Further in other exemplary embodiments, the airfoil 200 may include more than two spars, such as up to 10 spars.

It will further be appreciated that although the exemplary airfoils 200 described above with reference to FIGS. 2 through 8 are generally described with reference to a fan blade 100 of a fan of a gas turbine engine, in other exemplary embodiments, the configurations described above may apply to any other suitable airfoil 200, such as to any other suitable airfoil 200 of a gas turbine engine. For example, in other exemplary embodiments, aspects of the present disclosure may be incorporated into, e.g., one more outlet guide vanes (such as the exemplary outlet guide vanes 52 in FIG. 1), one or more compressor rotor blades, compressor stator vanes, turbine rotor blades, turbine stator vanes, nozzles, struts, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil defining a spanwise direction, a root end, and a tip end, the airfoil comprising: a body defining a pressure side and a suction side and extending along the spanwise direction between the root end and the tip end, the body formed of a composite material; and a spar enclosed in the body of the airfoil extending along the spanwise direction, the spar comprising a plurality of spar segments arranged in an overlapping configuration along the spanwise direction.

The airfoil of one or more of these clauses, wherein each spar segment of the plurality of spar segments is formed of a composite material.

The airfoil of one or more of these clauses, wherein the plurality of spar segments includes a first spar segment and a second spar segment, wherein the first and second spar segments are separately formed of a composite material and bonded together.

The airfoil of one or more of these clauses, wherein the plurality of spar segments includes a first spar segment and a second spar segment, wherein the first spar segment is bonded to the second spar segment using an adhesive.

The airfoil of one or more of these clauses, wherein the plurality of spar segments includes a first spar segment and a second spar segment, wherein the first spar segment and the second spar segment are bonded together at a lap joint.

The airfoil of one or more of these clauses, wherein the spar is a first spar, wherein the body of the airfoil further includes a second spar, wherein the first spar is a pressure side spar and wherein the second spar is a suction side spar.

The airfoil of one or more of these clauses, wherein the first spar substantially mirrors the second spar.

The airfoil of one or more of these clauses, wherein the first spar defines a plurality of overlap sections, wherein the second spar defines a plurality of overlap sections, and wherein the plurality of overlap section of the first spar are arranged in a unique configuration relative to the plurality of overlap sections of the second spar.

The airfoil of one or more of these clauses, wherein the plurality of spar segments includes at least three spar segments and up to thirty spars.

The airfoil of one or more of these clauses, wherein the plurality of spar segments includes a first spar segment and a second spar segment, wherein the first spar segment overlaps with the second spar segment at a first overlap section of the first spar segment, wherein the first spar segment defines a first overall length and a first overlap length of the first overlap section, wherein the first overlap length is equal to 15% or less of the first overall length.

The airfoil of one or more of these clauses, wherein the plurality of spar segments further includes a third spar segment, wherein the second spar segment overlaps with the third spar segment at a second overlap section of the second spar segment, wherein the second spar segment defines a second overlap length of the second overlap section, wherein the second overlap length is equal to 15% or less of the first overall length.

The airfoil of one or more of these clauses, wherein the first overlap length is not equal to the second overlap length.

The airfoil of one or more of these clauses, wherein the first spar segment is closer to the root end than the second spar segment, wherein the second spar segment is closer to the root end than the third spar segment, and wherein the first overlap length is greater than the second overlap length.

The airfoil of one or more of these clauses, wherein the first spar segment is closer to the root end than the second spar segment, wherein the second spar segment is closer to the root end than the third spar segment, wherein the second spar segment further defines a second overall length, and wherein the first overall length is greater than the second overall length.

A gas turbine engine comprising: an airfoil defining a spanwise direction, a root end, and a tip end, the airfoil comprising a body defining a pressure side and a suction side and extending along the spanwise direction between the root end and the tip end, the body formed of a composite material; and a spar enclosed in the body of the airfoil extending along the spanwise direction, the spar comprising a plurality of spar segments arranged in an overlapping configuration along the spanwise direction.

The gas turbine engine of one or more of these clauses, further comprising a fan and a turbomachine, wherein the fan is driven by the turbomachine, and wherein the airfoil is a fan blade of the fan.

The gas turbine engine of one or more of these clauses, wherein the plurality of spar segments includes a first spar segment and a second spar segment, wherein the first spar segment overlaps with the second spar segment at a first overlap section of the first spar segment, wherein the first spar segment defines a first overall length and a first overlap length of the first overlap section, wherein the first overlap length is equal to 15% or less of the first overall length.

The gas turbine engine of one or more of these clauses, wherein the plurality of spar segments further includes a third spar segment, wherein the second spar segment overlaps with the third spar segment at a second overlap section of the second spar segment, wherein the second spar segment defines a second overlap length of the second overlap section, wherein the second overlap length is equal to 15% or less of the first overall length.

The gas turbine engine of one or more of these clauses, wherein the first spar segment is closer to the root end than the second spar segment, wherein the second spar segment is closer to the root end than the third spar segment, and wherein the first overlap length is greater than the second overlap length.

The gas turbine engine of one or more of these clauses, wherein the first spar segment is closer to the root end than the second spar segment, wherein the second spar segment is closer to the root end than the third spar segment, wherein the second spar segment further defines a second overall length, and wherein the first overall length is greater than the second overall length.

We claim:

1. A gas turbine engine comprising:

an airfoil defining a spanwise direction, a root end, and a tip end, the airfoil comprising a body defining a pressure side and a suction side and extending along the spanwise direction between the root end and the tip end, the body formed of a composite material; and a spar enclosed in the body of the airfoil extending along the spanwise direction, the spar comprising a plurality of spar segments arranged in an overlapping configuration along the spanwise direction;

wherein the plurality of spar segments includes a first spar segment and a second spar segment, wherein the first spar segment overlaps with the second spar segment at a first overlap section of the first spar segment, wherein the first spar segment defines a first overall length and a first overlap length of the first overlap section, wherein the first overlap length is equal to 15% or less of the first overall length.

2. The gas turbine engine of claim 1, further comprising a fan and a turbomachine, wherein the fan is driven by the turbomachine, and wherein the airfoil is a fan blade of the fan.

3. The gas turbine engine of claim 1, wherein the plurality of spar segments further includes a third spar segment, wherein the second spar segment overlaps with the third spar segment at a second overlap section of the second spar segment, wherein the second spar segment defines a second overlap length of the second overlap section, wherein the second overlap length is equal to 15% or less of the first overall length.

4. The gas turbine engine of claim 3, wherein the first spar segment is closer to the root end than the second spar segment, wherein the second spar segment is closer to the root end than the third spar segment, wherein the second spar segment further defines a second overall length, and wherein the first overall length is greater than the second overall length.

5. An airfoil defining a spanwise direction, a root end, and a tip end, the airfoil comprising:

a body defining a pressure side and a suction side and extending along the spanwise direction between the root end and the tip end, the body formed of a composite material; and a spar enclosed in the body of the airfoil extending along the spanwise direction, the spar comprising a plurality of spar segments arranged in an overlapping configuration along the spanwise direction;

wherein the spar is a first spar, wherein the body of the airfoil further includes a second spar, wherein the first spar is a pressure side spar and wherein the second spar is a suction side spar; and wherein the first spar defines a plurality of overlap sections, wherein the second spar defines a plurality of overlap sections, and wherein the plurality of overlap section of the first spar are arranged in a unique configuration relative to the plurality of overlap sections of the second spar.

* * * * *